US012370810B2

(12) United States Patent
Oi

(10) Patent No.: US 12,370,810 B2
(45) Date of Patent: Jul. 29, 2025

(54) RECORDING DEVICE, CONTROL METHOD FOR RECORDING DEVICE, AND RECORDING SYSTEM

(71) Applicant: SEIKO EPSON CORPORATION, Tokyo (JP)

(72) Inventor: Tomoyuki Oi, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 198 days.

(21) Appl. No.: 18/191,303

(22) Filed: Mar. 28, 2023

(65) Prior Publication Data

US 2023/0321997 A1 Oct. 12, 2023

(30) Foreign Application Priority Data

Mar. 30, 2022 (JP) ................................ 2022-055308

(51) Int. Cl.

*B41J 3/407* (2006.01)
*B41J 29/19* (2006.01)
*B41J 29/393* (2006.01)
*B41J 29/42* (2006.01)

(52) U.S. Cl.

CPC ............ *B41J 3/4078* (2013.01); *B41J 29/19* (2013.01); *B41J 29/393* (2013.01); *B41J 29/42* (2013.01)

(58) Field of Classification Search

CPC .............................. B41J 3/4078; B41J 29/393

See application file for complete search history.

(56) References Cited

U.S. PATENT DOCUMENTS

2007/0188578 A1* 8/2007 Kayanaka ............... B41J 11/06 347/104

FOREIGN PATENT DOCUMENTS

JP 2019-131909 A 8/2019

* cited by examiner

*Primary Examiner* — Scott A Richmond

(74) *Attorney, Agent, or Firm* — WORKMAN NYDEGGER

(57) ABSTRACT

A recording device includes a recording head configured to perform recording on a T-shirt, a tray configured for placement of the T-shirt, the tray being configured to move in a front-rear direction including a position facing the recording head, a medium conveyance unit configured to move the tray in the front-rear direction, a reception unit configured to receive, from a host device, information related to a recording range corresponding to the tray, and a control unit. The information related to the recording range includes information about the front-rear direction, and the control unit moves, to a reference position, at least one of end positions of the recording range of the tray in the front-rear direction by controlling the medium conveyance unit, based on the information related to the recording range received by the reception unit.

9 Claims, 5 Drawing Sheets

RECORDING DEVICE, CONTROL METHOD FOR RECORDING DEVICE, AND RECORDING SYSTEM

The present application is based on, and claims priority from JP Application Serial Number 2022-055308, filed Mar. 30, 2022, the disclosure of which is hereby incorporated by reference herein in its entirety.

BACKGROUND

1. Technical Field

The present disclosure relates to a recording device, a control method for the recording device, and a recording system.

2. Related Art

In the related art, recording devices for printing patterns and the like on fabrics such as T-shirts have been known. Some recording devices perform unique printing one by one in accordance with customer's requests at a store or the like. For example, JP-A-2019-131909 discloses a method of setting fabrics to a printing device as the recording device as described above. This method includes a step of marking at four locations in the fabric, and a step of setting at a platen with the marks of the four locations of the fabric aligned with the light emission position of a light emission means.

However, with the method disclosed in JP-A-2019-131909, it is difficult to perform printing of patterns and the like aligned with the position intended by the operator. Specifically, in the above-described recording device, in some situation printing patterns and positions and the like are instructed from an information terminal such as a personal computer. At this time, the printing position displayed at the information terminal, and the position to be marked, i.e., the position where patterns and the like are to be printed, may not match in some situation. In particular, in the case of soft and variously-sized media such as T-shirts, it is difficult to align the position to be marked with the desired printing position in the up-down direction of the medium, i.e., the front-rear direction of the recording device. Consequently, the desired printing position and the actual printing position may be shifted from each other while it is easy to align the marked position with the printing position.

In addition, there is a method of projecting print images displayed on an information terminal to an actual medium using a projector and the like. With this method, the device has to be large and expensive while it is easy to align the desired printing position with the actual printing position. It is difficult for this method to install the device in stores and the like, which is disadvantageous from the standpoint of dissemination of the device. From the above, a recording device that can align the desired printing position and the actual printing position with a simple configuration is desired.

SUMMARY

A recording device includes a recording unit configured to perform recording on a medium, a placing part configured for placement of the medium, the placing part being configured to move in a front-rear direction including a position facing the recording unit, a moving mechanism configured to move the placing part in the front-rear direction, a reception unit configured to receive, from an external side, information related to a recording range corresponding to the placing part, and a control unit. The information related to the recording range includes information about the front-rear direction, and the control unit moves, to a reference position, at least one of end positions of the recording range of the placing part in the front-rear direction by controlling the moving mechanism, based on the information related to the recording range received by the reception unit.

A control method is a method for a recording device, the recording device including a recording unit configured to perform recording on a medium, a placing part configured for placement of the medium, the placing part being configured to move in a front-rear direction including a position facing the recording unit, a moving mechanism configured to move the placing part in the front-rear direction, a reception unit configured to receive, from an external side, information related to a recording range corresponding to the placing part, and a control unit. The information related to the recording range includes information about the front-rear direction, and at least one of end positions of the recording range of the placing part in the front-rear direction is moved to a reference position by the moving mechanism, based on the information related to the recording range received by the reception unit.

A recording system includes a recording device, a host device, a recording unit configured to perform recording on a medium, a placing part configured for placement of the medium, the placing part being configured to move in a front-rear direction including a position facing the recording unit, a moving mechanism configured to move the placing part in the front-rear direction, a recording side reception unit configured to receive, from an external side, information related to a recording range corresponding to the placing part, and a recording side control unit. The information related to the recording range includes information about the front-rear direction, and the host device includes a host side transmission unit, and a host side control unit, the host side control unit transmits the information related to the recording range to the recording device by using the host side transmission unit, and the recording side control unit moves, to a reference position, at least one of end positions of the recording range of the placing part in the front-rear direction by controlling the moving mechanism, based on the information related to the recording range received by the recording side reception unit.

DESCRIPTION OF EXEMPLARY EMBODIMENTS

In this embodiment, an example of a recording device 1 that performs printing of a pattern and the like in a unique manner one by one on fabrics such as T-shirt is described. The recording device 1 is an ink-jet printer. The recording device 1, a control method for the recording device 1, and a recording system including the recording device 1 according to this embodiment are described below with reference to the accompanying drawings.

The drawings described below are illustrated with XYZ axes as coordinate axes orthogonal to one another as necessary. The direction pointed with each arrow is the + direction, and the direction opposite to the + direction is the – direction. The Y axis is along the front-rear direction of the recording device 1, and the +Y direction of the recording device 1 is the front side. The X axis is along the left-right direction of the recording device 1, and the +X direction of the recording device 1 is the left side. The Z axis is a virtual axis along the vertical direction. The +Z direction is the upper side, and the –Z direction is the lower side in the recording device 1. The direction along the X axis is the left-right direction, the direction along the Y axis is the front-rear direction, and the direction along the Z axis is the up-down direction.

Figure 1:
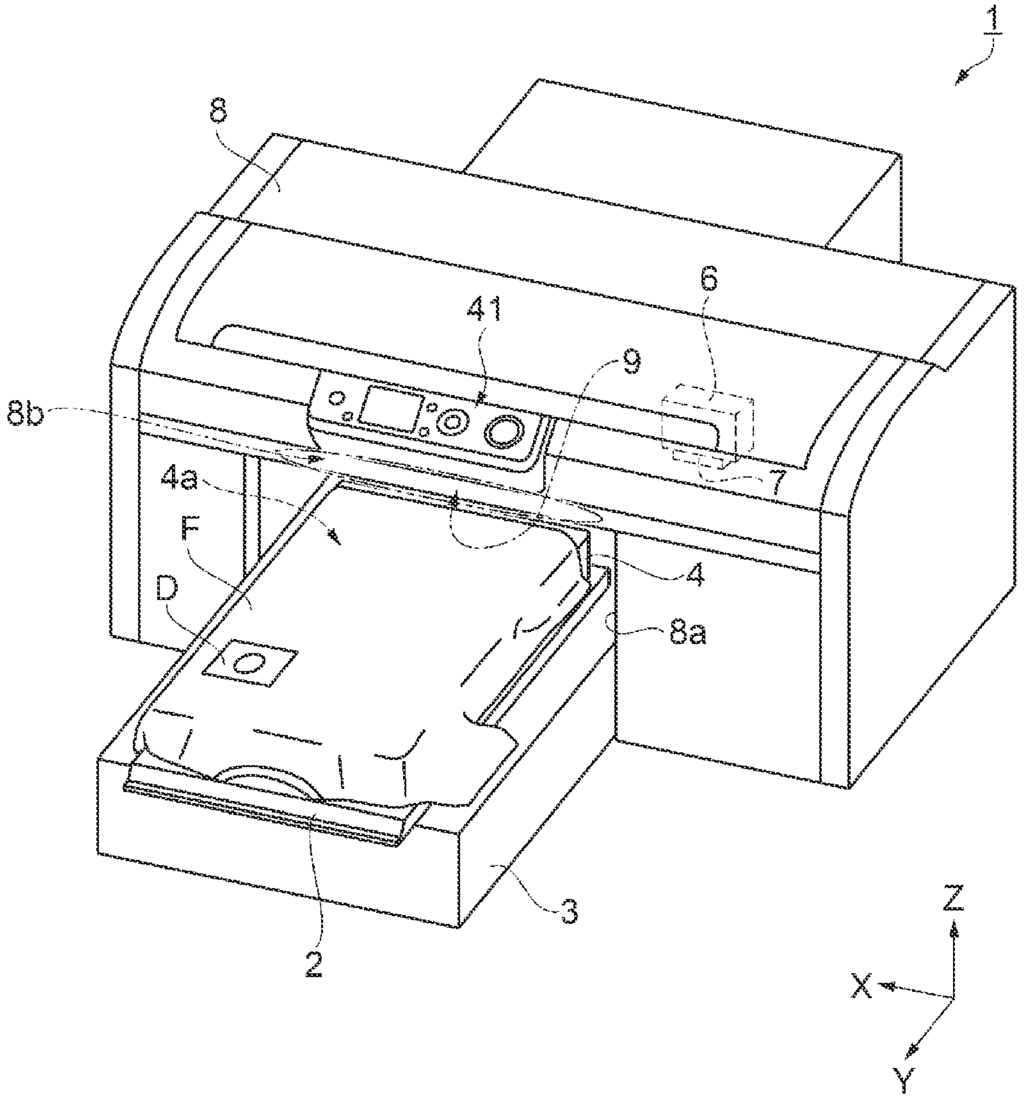
FIG. 1 is a perspective view illustrating a configuration of a recording device according to an embodiment.

As illustrated in FIG. 1, the recording device 1 includes an exterior member 8, an operation panel 41 serving as an input unit, a recording head 7 serving as a recording unit, an illumination mechanism 9, a medium conveyance unit 3 serving as a moving mechanism, and a tray 4 serving as a placing part. In addition, although not illustrated in the drawing, the recording device 1 includes a control unit 25 and a reception unit 35*a* described later inside the exterior member 8. FIG. 1 illustrates a state where a T-shirt F, which is a medium, is placed on a placing surface 4*a* of the tray 4. At the chest part of the T-shirt F, a pattern D has been printed with the recording device 1.

The exterior member 8 is a housing with a substantially cuboid shape, and houses the recording head 7, a carriage 6, and other various components inside. The operation panel 41 serving as an input unit is disposed on the front and upper sides of the exterior member 8.

For operations of the recording device 1, the operation panel 41 has a display function for displaying a variety of information and an input function for receiving various instructions corresponding to operational conditions and the like. The operation panel 41 includes a liquid crystal display device of a touch-panel type, for example. The operation panel 41 includes the control unit 25. The operation panel 41 may be provided with various buttons separately from the above-described liquid crystal display device. Note that the various instructions related to the operation of the recording device 1 may be inputted to the recording device 1 through an information terminal such as a personal computer, for example.

The recording head 7 is disposed below the carriage 6. The recording head 7 performs recording, i.e., printing, on the T-shirt F. Although not illustrated in the drawing, the recording head 7 includes a nozzle surface at a position facing downward. The nozzle surface faces a platen in the up-down direction when printing is performed by the recording device 1. A plurality of nozzle rows are disposed in the nozzle surface.

Each of the plurality of nozzle rows is composed of a plurality of nozzles, and individually ejects inks of colors such as cyan, magenta, yellow and black, for example. These inks are supplied to the recording head 7 through a pipe from an ink container (not illustrated in the drawing) housed in the exterior member 8. The ink ejected from the recording head 7 may be a clear ink and processing liquid as well as the above-described color inks.

The recording head 7 uses a piezoelectric element as an actuator that is a driving means for ink ejection. The driving means is not limited to this. The driving means may be an electromechanical conversion element that displaces a diaphragm serving as an actuator through electrostatic attraction, or an electrothermal conversion element that ejects inks by using bubbles resulting from heating, for example.

Although not illustrated in the drawing, the carriage 6 is connected to a synchronous belt, and the synchronous belt is driven by a carriage motor 32 described later. The synchronous belt moves the carriage 6 in the left-right direction, which is the main scanning direction, through the driving of the carriage motor 32. In this manner, the recording head 7 moves back and forth in the left-right direction while facing the platen in the up-down direction.

The medium conveyance unit 3 is disposed to protrude to the front side from an opening 8*a* of the exterior member 8 on the lower side of the surface facing the front side of the exterior member 8. A medium support unit 2 is disposed on the upper side of the medium conveyance unit 3. Further, the tray 4 is supported by the medium support unit 2 on the upper side of the medium support unit 2. The T-shirt F is placed on the placing surface 4*a*, facing upper side, of the tray 4. Here, FIG. 1 illustrates the tray 4 at a position where the T-shirt F can be placed and taken out.

Although not illustrated in the drawing, the medium conveyance unit 3 moves the medium support unit 2 and the tray 4 in the front-rear direction through the driving of a conveyance motor 33 described later. In other words, the tray 4 can be moved by the medium conveyance unit 3 in the front-rear direction including a position facing the recording head 7.

The above-described platen is a region facing the recording head 7 at the placing surface 4*a* when printing is performed by the recording device 1. That is, printing is performed on the T-shirt F placed on the tray 4 at the platen. Specifically, the printing is performed at a position where the tray 4 and the medium support unit 2 are retracted from the position illustrated in FIG. 1. At this time, the tray 4 and the medium support unit 2 can be retracted to a position protruded rearward from the surface facing the rear side of the exterior member 8. Thus, the printing can be performed to the region around the end portion of the tray 4 in the +Y direction on the T-shirt F placed on the tray 4.

The pattern D and the like are printed on the T-shirt F by ejecting ink from the recording head 7 at a predetermined timing while linking the movement of the tray 4 in the front-rear direction and the back-and-forth movement of the carriage 6 in the left-right direction.

Here, it is difficult for known recording devices to set the position when placing fabrics because fabrics such as the T-shirt F are soft and diverse in form. Consequently, the desired printing position and the actual printed position in the fabric are easily shifted from each other. In particular, the positioning in the front-rear direction tends to be difficult while the positioning in the left-right direction is relatively easy.

Conversely, in the recording device 1, the position where the printing is performed in the front-rear direction can be confirmed and adjusted in advance by the operator of the recording device 1. Although details are described later, the edge along the X axis on the upper side at the opening 8*a* of the exterior member 8 is an instruction part 8*b*. Although not illustrated in the drawing, in top plan view, the position overlapping the instruction part 8*b* in the placing surface 4*a* of the tray 4 is a reference position 10 described later.

The operator can move the tray 4 to the reference position 10 through the control unit 25 after placing the T-shirt F on the tray 4. At this time, at least one of end positions in the front-rear direction moves to the reference position 10 in the recording range of the pattern to be printed and the like. The operator confirms the reference position 10 corresponding to the T-shirt F placed on the tray 4 with a guide of the instruction part 8*b*. Thereafter, the T-shirt F can be placed again on the tray 4.

The reference position 10 need only correspond to a part of the exterior member 8. Specifically, the instruction part 8*b* may protrude to the front side from the exterior member 8, for example. This increases the ease of the positioning in the front-rear direction in the recording range of the T-shirt F with a guide of a part of the exterior member 8.

Further, in the recording device 1, the control unit 25 illuminates the reference position 10 corresponding to the T-shirt F placed on the tray 4 with the illumination mechanism 9. Specifically, the illumination mechanism 9 is disposed on a slightly backward side of the instruction part 8*b* of the exterior member 8, and orientated in a direction to illuminate approximately downward. The illuminating light from the illumination mechanism 9 in the form of one or more dots or lines illuminates the reference position 10. In this manner, the visibility of the reference position 10 is improved, and the ease of the front-rear positioning of the recording range is further increased. Examples of the illumination mechanism 9 may include solid light sources such as light-emitting diodes and semiconductor lasers.

Note that the T-shirt F may be fixed to the tray 4 with a frame shaped fixing device covering the outer periphery of the tray 4 and the like when placed on the tray 4. Further, a scale or the like may be provided on the fixing device to easily confirm the reference position 10. Note that the medium on which the printing is performed with the recording device 1 is not limited to the T-shirt F.

Figure 2:
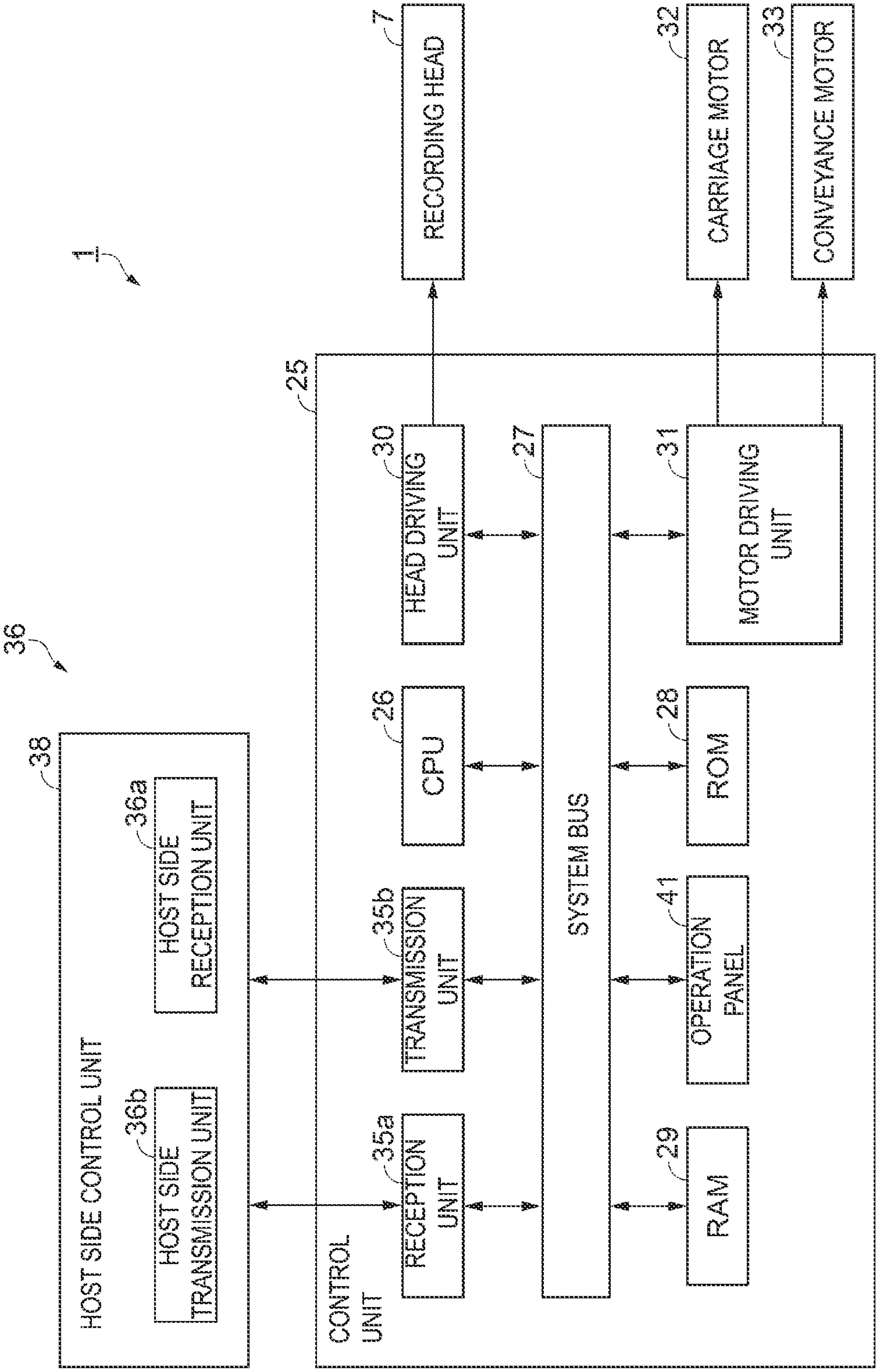
FIG. 2 is a block diagram illustrating a configuration of a recording system.

As illustrated in FIG. 2, the recording system according to this embodiment includes the recording device 1 and a host device 36. The host device 36 is an information terminal such as a personal computer, for example. In FIG. 2, illustration of the components such as a central processing unit (CPU), a display monitor and the like of the host device 36 is omitted.

The control unit 25 of the recording device 1 is an example of a recording side control unit in the recording system of this embodiment. The control unit 25 includes the reception unit 35*a*, a transmission unit 35*b*, a CPU 26, a system bus 27, a read only memory (ROM) 28, a random access memory (RAM) 29, a head driving unit 30, a motor driving unit 31, and the operation panel 41.

In the recording system of this embodiment, the reception unit 35*a* is an example of a recording side reception unit, and the transmission unit 35*b* is an example of a recording side transmission unit.

The head driving unit 30 is electrically connected to the recording head 7. The motor driving unit 31 is electrically connected to the carriage motor 32 and the conveyance motor 33.

The CPU 26 manages the entire control of the recording device 1. The CPU 26 is electrically connected to the ROM 28, the RAM 29, the head driving unit 30, the motor driving unit 31, the reception unit 35*a*, the transmission unit 35*b*, and the operation panel 41 through the system bus 27. The ROM 28 stores various control programs executed by the CPU 26, maintenance sequences and the like. The RAM 29 temporarily stores data.

The head driving unit 30 drives the recording head 7. The motor driving unit 31 drives the carriage motor 32 and the conveyance motor 33. Various instructions input to the operation panel 41 are transmitted to the CPU 26.

The host device 36 includes a host side control unit 38 and a monitor 39 not illustrated in the drawing. The host side control unit 38 includes a host side reception unit 36*a* and a host side transmission unit 36*b*. The host device 36 transmits and receives a variety of information such as the operational conditions of the recording device 1 and print data between it and the recording device 1. The host side reception unit 36*a* corresponds to the transmission unit 35*b*, and the host side transmission unit 36*b* corresponds to the reception unit 35*a*. The variety of information may be transmitted and received between the recording device 1 and the host device 36 in either of a wired or wireless manner. In the recording system of this embodiment, the various instructions related to the operation of the recording device 1 may be input also from the host device 36.

The reception unit 35*a* receives information related to the recording range such as the pattern D corresponding to the tray 4 from the host side transmission unit 36*b* of the host device 36, which is the external side. With the transmission unit 35*b*, the control unit 25 transmits the information related to the changed recording range to the host side reception unit 36*a* of the host device 36.

With the host side transmission unit 36*b*, the host side control unit 38 transmits the information related to the recording range to the reception unit 35*a* of the recording device 1. From the recording device 1, the host side reception unit 36*a* receives the information related to the recording range transmitted by the transmission unit 35*b*. Note that details of the above-described information related to the recording range are described later.

Figure 3:
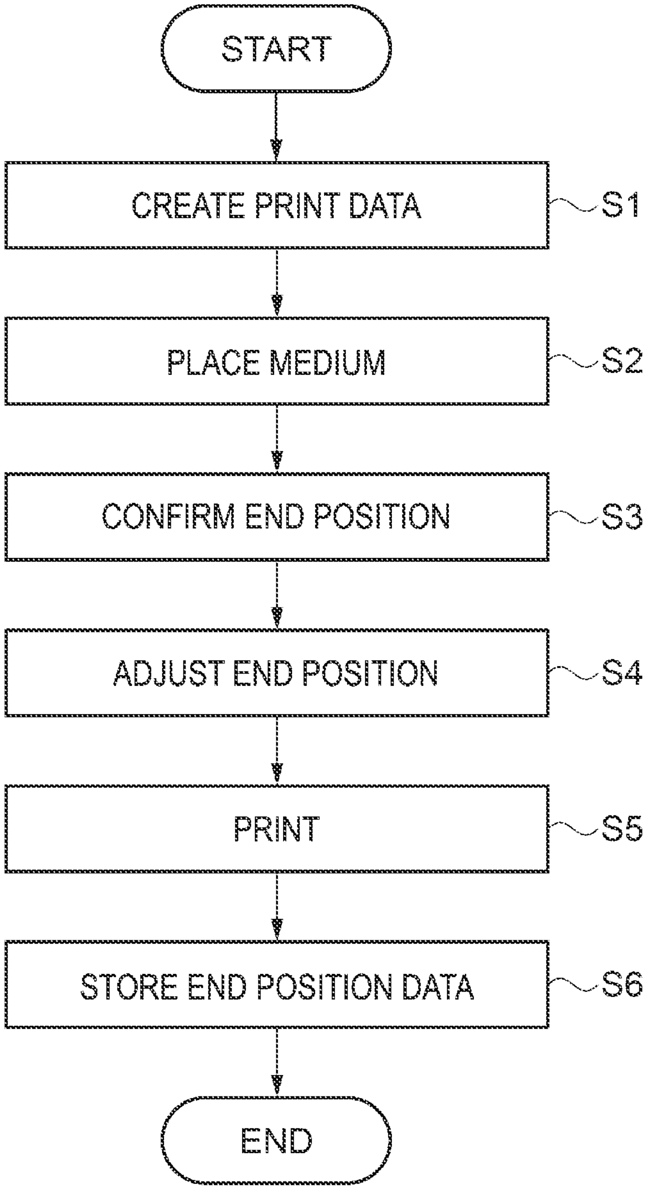
FIG. 3 is a flow chart illustrating execution of printing in the recording device.

As illustrated in FIG. 3, a procedure of execution of printing by the recording device 1 and the host device 36 includes step S1 to step S6. At step S1, print data is created. At step S2, the T-shirt F is placed on the recording device 1. At step S3, the end position of the recording range of the pattern D is confirmed. At step S4, the above-described end position is adjusted. At step S5, printing is performed. At step S6, end position data is stored in the case where the above-described end position is adjusted at step S4. The control method for the recording device 1 of this embodiment is described below with the above-described procedure.

At step S1, print data is created at the host device 36. Specifically, with an application such as raster image processor (RIP) software, data of patterns, images, texts, designs and the like as print data are created.

Figure 4:
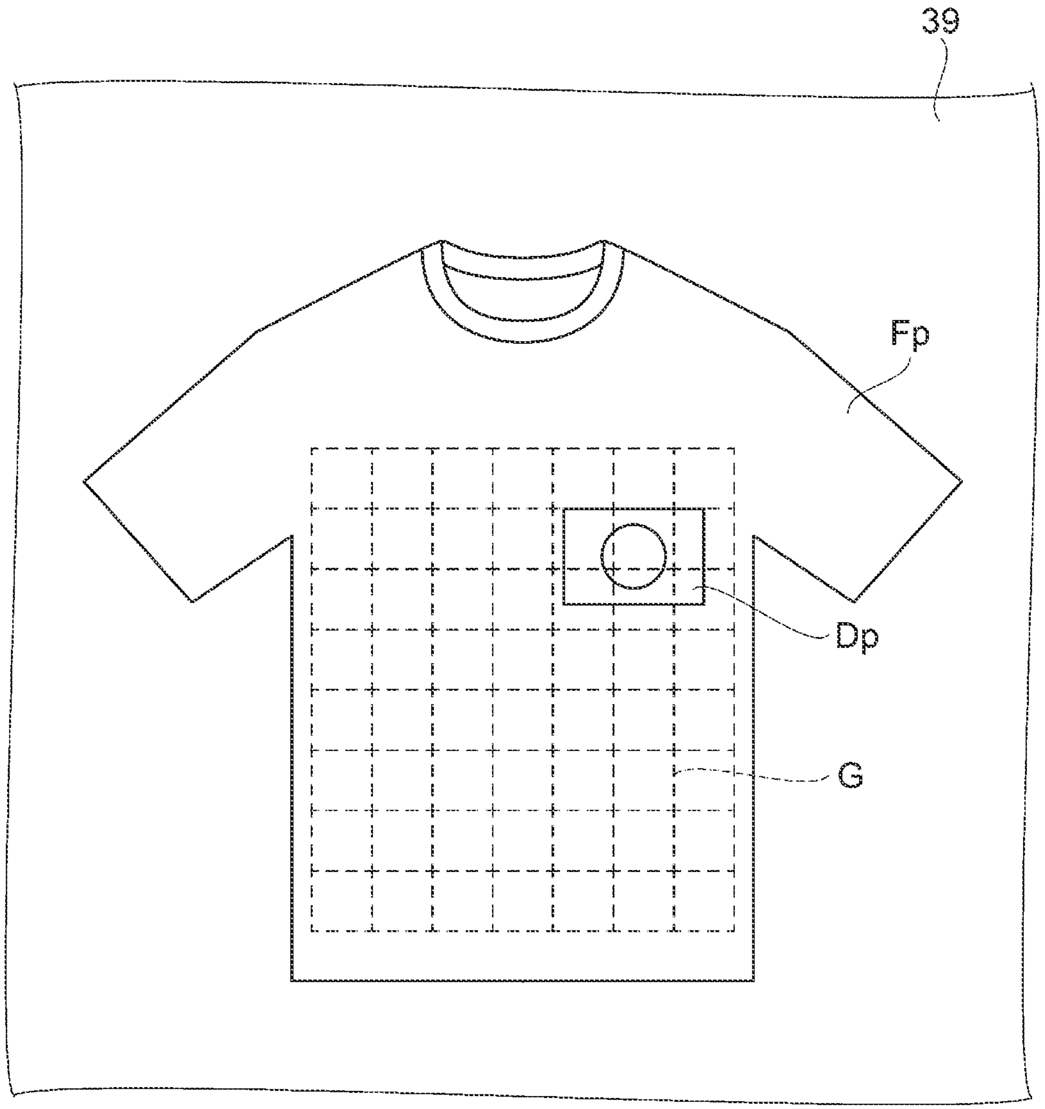
FIG. 4 is a schematic view illustrating a print data creation screen in a host device.

More specifically, as illustrated in FIG. 4, the arrangement and size of a pattern model Dp are considered with a guide of a grid G of the T-shirt model Fp with reference to the display of the monitor 39 of the host device 36. The pattern model Dp corresponds to the pattern D to be printed on the T-shirt F. At this time, the position of the pattern model Dp in the created print data is the desired printing position of the pattern D.

The created print data includes the information related to the recording range of the pattern model Dp. The above-described information related to the recording range includes information about the arrangement of the T-shirt model Fp of FIG. 4 in the up-down direction, i.e., the arrangement of the T-shirt F placed on the tray 4 in the front-rear direction. More specifically, the above-described information about the arrangement in the front-rear direction includes the arrangement of the upper end portion and lower end portion of the pattern model Dp in the vertical direction of the T-shirt model Fp, or in other words, information about the end position of the pattern D in the front-rear direction when printing is performed.

In addition, the above-described information related to the recording range includes the information about the arrangement of the T-shirt model Fp of FIG. 4 in the left-right direction, i.e., the arrangement of the T-shirt F placed on the tray 4 in the left-right direction. The left-right direction intersects the above-described front-rear direction. More specifically, the above-described information about the arrangement in the left-right direction includes the arrangement of the right end portion and left end portion of the pattern model Dp in the left-right direction of the T-shirt model Fp, or in other words information about the end position of the pattern D in the left-right direction when printing is performed. The created print data is transmitted to the reception unit 35*a* of the control unit 25 of the recording device 1 from the host side transmission unit 36*b* of the host device 36.

In addition, regarding the transmission of the above-described information related to the recording range by the host device 36, arrangement information specified by the host device 36 side on the basis of the print data may be transmitted as the information related to the recording range, or print data itself may be transmitted as the recording range information. In the case where the information related to the recording range is used as print data itself, the arrangement information is specified by the recording device 1 side on the basis of the print data.

Figure 5:
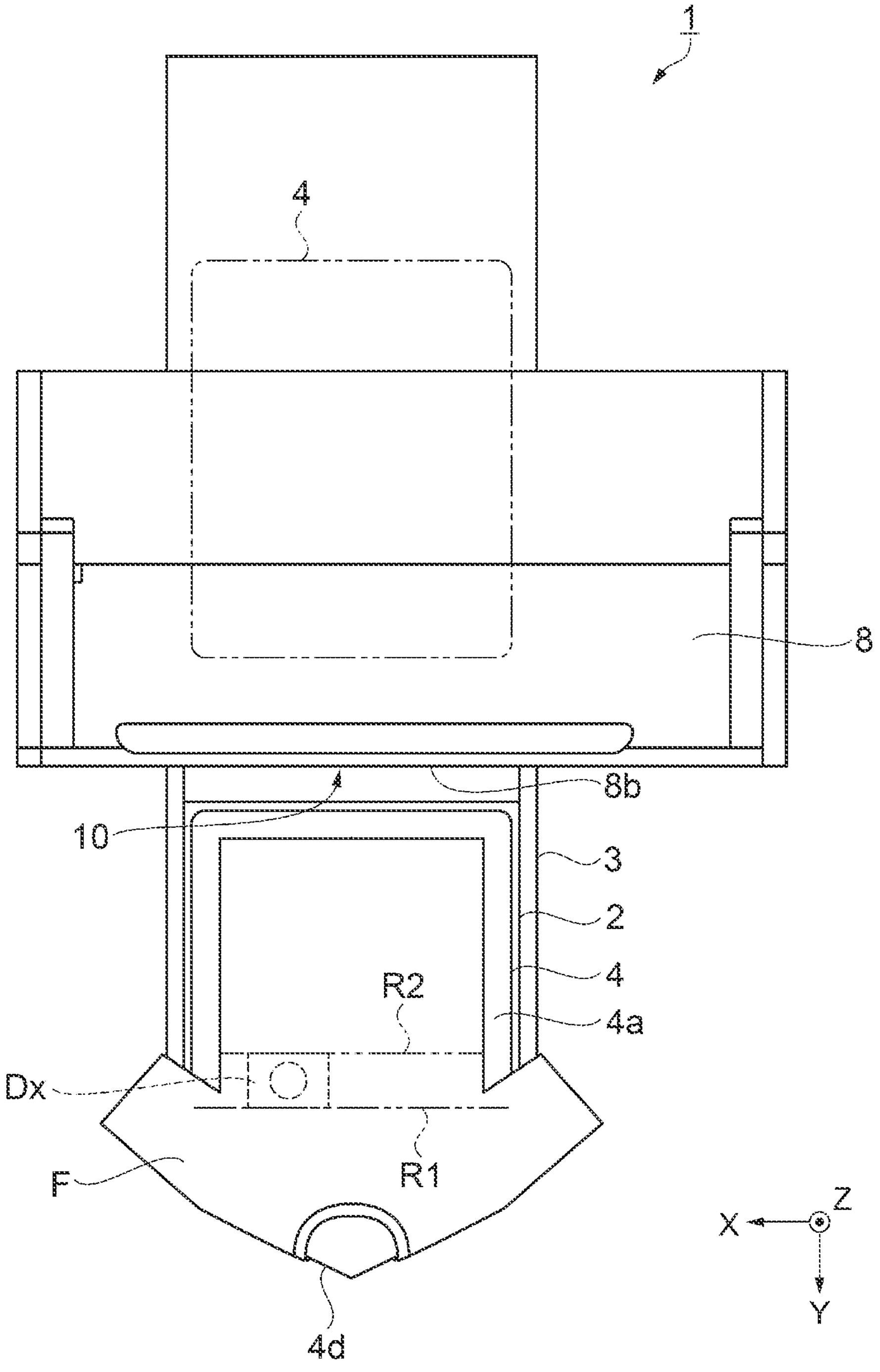
FIG. 5 is a plan view illustrating a method of confirming an end position in the recording device.

At step S2, the T-shirt F is placed on the tray 4 of the recording device 1. Specifically, as illustrated in FIG. 5, the T-shirt F is placed in the state where the medium support unit 2 and the tray 4 are moved to the most forward position with respect to the recording device 1. Here, the tray 4 and the medium support unit 2 can be retracted to the position indicated with the chain double-dashed line at the execution of the printing. Note that illustration of the operation panel 41 is omitted in FIG. 5 for the sake of convenience of illustration.

The tray 4 includes a hanger part 4*d*. The hanger part 4*d* is provided to protrude forward from the placing surface 4*a* of the tray 4. The T-shirt F is placed while the hanger part 4*d* is inserted to the T-shirt F. The position where the T-shirt F is placed is a position where the portion corresponding to the neck to shoulders of the T-shirt F hits the hanger part 4*d*.

At this time, the arrangement of the T-shirt F in the front-rear direction with respect to the tray 4 may be made by visually aligning it with respect to the placing surface 4*a*, or with a guide of a mark not illustrated in the drawing of the exterior member 8. The alignment in the left-right direction is relatively easier than the alignment in the front-rear direction. The arrangement of the T-shirt F in the front-rear direction with respect to the tray 4 can be confirmed and adjusted at steps S3 and S4. Therefore, in this phase, it is not necessary to consider the above-described alignment of the desired printing position and the actual printing position in the front-rear direction.

At step S3, the operator confirms the end position of the pattern D in the T-shirt F placed on the tray 4. More specifically, the operator inputs an instruction of print end position confirmation from the touch panel of the operation panel 41 and the like. The instruction of the end position confirmation may be performed through the printer driver of the host device 36 and the like.

Here, the print data transmitted to the recording device 1 includes the information related to the recording range corresponding to the placing surface 4*a* of the tray 4. The information includes the information about the front-rear direction and information about the left-right direction of the above-described recording range. It should be noted here that the above-described recording range does not correspond to the T-shirt F placed on the tray 4, but to the placing surface 4*a* of the tray 4. That is, at this time point, the position where the pattern D is printed on the T-shirt F and the position of a print schedule pattern Dx included in the print data are not necessarily coincide with each other.

The above-described information about the front-rear direction includes location information about an end position R1 on the front side and an end position R2 on the rear side in the print schedule pattern Dx at the tray 4. That is, the arrangement of the print schedule pattern Dx in the front-rear direction is defined by the end positions R1 and R2 at the tray 4. In other words, the printing of the pattern D is performed in the range from the end position R1 to the end position R2 in the front-rear direction.

In response to the above-described instruction from the operation panel 41, the control unit 25 controls the medium conveyance unit 3 through the conveyance motor 33 on the basis of the information related to the recording range received by the reception unit 35*a*. In this manner, the tray 4 moves rearward together with the medium support unit 2. Then, at least one of the end position R1 and the end position R2 moves to the reference position 10 overlapping the instruction part 8*b* in top plan view. The operator may select one end position or both end positions in the confirmation of the end position.

In the control method for the recording device 1 of this embodiment, at least one of the end positions R1 and R2 in the front-rear direction of the tray 4 is moved to the reference position 10 by the medium conveyance unit 3 on the basis of the information related to the recording range received by the reception unit 35*a* as described above.

In addition, the control unit 25 adjusts and illuminates the irradiation range of the illumination mechanism 9 not illustrated in the drawing in the left-right direction in accordance with the information about the left-right direction. Specifically, at the reference position 10, the illumination mechanism 9 illuminates in a linear shape the recording range of the print schedule pattern Dx in the left-right direction to clearly indicate the recording range in the left-right direction. In this manner, the arrangement of the print schedule pattern Dx in the left-right direction is clearly indicated for the T-shirt F placed on the tray 4. Thus, it is easy to set the position of the pattern D in the left and right directions in the T-shirt F. In addition, the recording range may be clearly indicated by illuminating at least one of the end positions of the left side and the right side of the print schedule pattern Dx. In this case, the operator may select one end position or both end positions in the left-right direction in the confirmation of the end position.

Note that after the recording device 1 receives the print data, the clear indication of the end positions R1 and R2 may not be automatically made, and may be arbitrarily made by the operator. That is, in the case where information about both end positions in the front-rear direction is received as the information related to the recording range, the control unit 25 may control the medium conveyance unit 3 in accordance with an instruction made at the operation panel 41 by the operator to move one and the other of the end positions R1 and R2 to the reference position 10 at the tray 4. In this manner, the operator can confirm the end positions R1 and R2 at any timing.

In the above-described manner, the operator confirms the end positions R1 and R2 or the end positions in the left-right direction in light of the desired printing position, and determines the necessity of adjustment of the position of the T-shirt F at the tray 4. When the position adjustment is unnecessary, the process proceeds to step S5 by skipping the next step S4.

At step S4, the end positions R1 and R2 or the end positions in the left-right direction are adjusted as necessary. The operator can adjust the end positions R1 and R2 in the front-rear direction via the operation panel 41. More specifically, an instruction for the movement and the movement amount of one of the end positions R1 and R2 is made using the touch panel, buttons and the like of the operation panel 41. The other of the end positions R1 and R2 is moved in a linked manner.

In this manner, the control unit 25 changes the end positions R1 and R2 of the recording range in the front-rear direction by moving the tray 4 by controlling the medium conveyance unit 3 in accordance with the above-described instruction at the operation panel 41.

In the case where adjustment of the end positions in the left-right direction is required, the print data may be recreated by returning to step S1, or the T-shirt F may be placed again on the tray 4 by returning to step S2. In addition, the end positions R1 and R2 may also be adjusted by returning to step S1 or step S2 as with the adjustment in the left-right direction. When the position of the print schedule pattern Dx coincides with the desired printing position, the process proceeds to step S5.

At step S5, the operator makes an instruction for execution of printing from the printer driver of the host device 36. In this manner, the instruction for execution of printing is transmitted to the recording device 1, and the pattern D is printed on the T-shirt F. After the completion of the printing, the tray 4 moves to and stops at the most forward position, and thus the T-shirt F can be removed from the tray 4.

At step S6, in the case where the end positions R1 and R2 are adjusted at step S4, the control unit 25 transmits, to the host device 36, the information related to the recording range including the changed end positions R1 and R2 as necessary. The above-described information is transmitted from the transmission unit **35*b* of the recording device 1 to the host side reception unit 36*a* of the host device 36. At the host device 36, the host side control unit 38 updates the information related to the recording range stored in a RAM not illustrated in the drawing on the basis of the changed end positions R1 and R2 included in the information related to the recording range. In this manner, in the case where the pattern D is repeatedly printed on a plurality of the T-shirts F, steps S3 and S4** can be omitted.

According to this embodiment, the following effects can be obtained. The desired printing position and the actual printing position can be matched with a simple configuration. Specifically, the end position R1 or the end position R2 moves to the reference position 10, and thus the position of the recording range in the front-rear direction is clearly indicated for the T-shirt F placed on the tray 4. Thus, the position of the recording range in the front-rear direction in the T-shirt F can be easily set.

In addition, since the end position R1 or the end position R2 is clearly indicated without using a projector mechanism such as a projector, the configuration is less complicated. Thus, it is possible to provide the recording device 1, the control method for the recording device 1, and the recording system that match the desired printing position and the actual printing position with a simple configuration.

What is claimed is:

1. A recording device comprising:

a recording unit configured to perform recording on a medium according to print data;

a placing part configured for placement of the medium, the placing part being configured to move in a front-rear direction including a position facing the recording unit;

a moving mechanism configured to move the placing part in the front-rear direction;

a reception unit configured to receive, from an external side, information related to a recording range corresponding to the placing part; and a control unit, wherein the information related to the recording range includes information about the front-rear direction, the control unit moves, to a reference position, at least one of end positions of the recording range of the placing part in the front-rear direction by controlling the moving mechanism, based on the information related to the recording range received by the reception unit, and when an adjustment of the end positions is required, the print data is recreated according to the adjustment.

2. The recording device according to claim 1, further comprising an exterior member, wherein the reference position corresponds to a part of the exterior member.

3. The recording device according to claim 1, further comprising an illumination mechanism, wherein the control unit illuminates the reference position using the illumination mechanism.

4. The recording device according to claim 3, wherein the information related to the recording range includes information about a left-right direction that intersects the front-rear direction; and the control unit adjusts an irradiation range of the illumination mechanism in the left-right direction in accordance with the information about the left-right direction.

5. The recording device according to claim 1, further comprising:

an input unit configured to receive an instruction; and a transmission unit, wherein the control unit changes the end position of the recording range by moving the placing part by controlling the moving mechanism in accordance with the instruction to the input unit, and the control unit transmits, to the external side, the information related to the recording range including the changed end position, by the transmission unit.

6. The recording device according to claim 1, further comprising an input unit configured to receive an instruction, wherein when information about both of the end positions in the front-rear direction are received as the information related to the recording range, the control unit moves one of the end positions and the other of the end positions in the placing part to the reference position by controlling the moving mechanism in accordance with the instruction to the input unit.

7. A control method for a recording device, the recording device including:

a recording unit configured to perform recording on a medium according to print data;

a placing part configured for placement of the medium, the placing part being configured to move in a front-rear direction including a position facing the recording unit;

a moving mechanism configured to move the placing part in the front-rear direction;

a reception unit configured to receive, from an external side, information related to a recording range corresponding to the placing part; and a control unit, wherein the information related to the recording range includes information about the front-rear direction, at least one of end positions of the recording range of the placing part in the front-rear direction is moved to a reference position by the moving mechanism, based on the information related to the recording range received by the reception unit, and when an adjustment of the end positions is required, the print data is recreated according to the adjustment.

8. A recording system comprising:

a recording device;

a host device;

a recording unit configured to perform recording on a medium according to print data;

a placing part configured for placement of the medium, the placing part being configured to move in a front-rear direction including a position facing the recording unit;

a moving mechanism configured to move the placing part in the front-rear direction;

a recording side reception unit configured to receive, from an external side, information related to a recording range corresponding to the placing part; and a recording side control unit, wherein the information related to the recording range includes information about the front-rear direction, and the host device includes:

a host side transmission unit, and a host side control unit, the host side control unit transmits the information related to the recording range to the recording device using the host side transmission unit, the recording side control unit moves, to a reference position, at least one of end positions of the recording range of the placing part in the front-rear direction by controlling the moving mechanism, based on the information related to the recording range received by the recording side reception unit, and when an adjustment of the end positions is required, the print data is recreated according to the adjustment.

9. The recording system according to claim 8, wherein the recording device includes:

an input unit configured to receive an instruction, and a recording side transmission unit;

the host device includes a host side reception unit;

the recording side control unit changes the end position of the recording range by moving the placing part by controlling the moving mechanism in accordance with the instruction to the input unit;

the recording side control unit transmits, to the host device, the information related to the recording range including the changed end position, using the recording side transmission unit;

the host side reception unit receives the information related to the recording range transmitted by the recording side transmission unit; and the host side control unit updates the information related to the recording range, based on the changed end position included in the information related to the recording range.

* * * * *